United States Patent [19]
Robin et al.

[11] Patent Number: 5,299,761
[45] Date of Patent: Apr. 5, 1994

[54] RAISABLE LANDING GEAR HAVING A SHORTENABLE LEG

[75] Inventors: Daniel Robin, Montrouge; Alain Poiret, Paris; Pierre Woerner, Fontenay Aux Roses, all of France

[73] Assignee: Messier-Bugatti, Velizy Villacoublay, France

[21] Appl. No.: 22,272

[22] Filed: Feb. 25, 1993

[30] Foreign Application Priority Data

Mar. 11, 1992 [FR] France .................................. 92 02921

[51] Int. Cl.⁵ .............................................. B64C 25/10
[52] U.S. Cl. .................................. 244/102 SS; 244/102 R
[58] Field of Search ....... 244/102 R, 102 SL, 202 SS, 244/104 FP, 104 R

[56] References Cited

U.S. PATENT DOCUMENTS

| | | | |
|---|---|---|---|
| 2,319,446 | 5/1943 | Dowty | 244/102 SS |
| 4,561,612 | 12/1985 | Masclet | 244/104 FP |
| 4,749,152 | 6/1988 | Leaux et al. | 244/104 FP |

FOREIGN PATENT DOCUMENTS

| | | | |
|---|---|---|---|
| 556820 | 5/1958 | Canada | 244/102 SS |
| 1756287 | 5/1979 | Fed. Rep. of Germany | 244/104 FP |
| 996613 | 8/1954 | France | 244/104 SS |
| 1011830 | 1/1965 | United Kingdom | |
| 2237781 | 7/1989 | United Kingdom | |

Primary Examiner—Galen L. Barefoot
Attorney, Agent, or Firm—Sixbey, Friedman, Leedom & Ferguson

[57] ABSTRACT

The invention relates to raisable landing gear having a shortenable leg, including a shock absorber fitted with a plunger rod, and a linkage connecting said plunger rod to the strut of the shock absorber, under the control of a resilient connecting rod having a threshold, serving to pull on the shock absorber when the leg is raised. According to the invention, the linkage includes two arms forming an alignment, with a first arm hinged on the plunger rod and having a lateral appendix whose free end is capable of co-operating with a stationary cam secured to the structure of the airplane, and a second arm which is hinged to the strut. The lateral appendix and the stationary cam are organized to operate in an emergency, in the event of the threshold connecting rod failing, thereby ensuring that the shock absorber is extended and that said lengthened shock absorber is locked in the undercarriage-down position.

8 Claims, 4 Drawing Sheets

RAISABLE LANDING GEAR HAVING A SHORTENABLE LEG

The present invention relates to aircraft landing gear, and more particularly to landing gear of the type having a shortenable leg.

BACKGROUND OF THE INVENTION

Shortenable raisable landing gear is known that includes a leg hinged to the structure of an airplane, the leg being constituted by a strut housing a shock absorbing mainly composed by a sliding rod and a shock absorber plunger rod, together with a linkage connecting said plunger rod to the strut and under the control of a resilient connecting rod having a threshold and fixed to the airplane structure so as to pull the shock absorber while the leg is being raised and so as to push said shock absorber while said leg is being lowered.

That disposition makes it possible to obtain landing gear which is long in the undercarriage-down position and short in the undercarriage-up position (thus making it easier to integrate the landing gear inside the associated housing in the airplane).

Another possible approach for obtaining the same result consists in using extensible landing gear of a structure that is capable, while the airplane is stationary on the ground, of exerting a force equivalent to the static load thereof, thereby raising the strut of the shock absorber relative to the sliding rod.

The first approach, which is the approach adopted by the present invention, consists in using landing gear of the above-specified type having a shortenable leg, in which the linkage is organized to lengthen the leg while the landing gear is being lowered, before the wheels touch the ground: lengthening is then intrinsically controlled by the structure without the pilot being required to trigger any kind of mechanism, in contrast to extensible landing gear.

FIGS. 1 and 2 show prior art landing gear having a shortenable leg, and complying with the above definition.

The axial section of FIG. 1 thus shows raisable landing gear 100 comprising a leg 101 hinged about an axis 102 to the structure of an airplane, and including a strut 103 and a sliding rod 104 fitted with a shock-absorbing plunger rod 105 disposed coaxially about the axis X of the strut. The bottom of the strut 103 has forks 106 hinged to two actuators 107 for steering the wheels, the rods of said actuators being connected to a rotary sleeve 109 coaxial with the strut. The bottom of the sliding rod 104 carries a set of wheels (represented solely by an axle 109), and it is connected to the strut 103 by a scissors linkage having two arms 110 and 111. The sliding rod 104 also includes a transverse wall constituting an intermediate partition that defines a bottom hydraulic fluid chamber 113 which communicates in turn via a diaphragm with a top hydraulic chamber 114 inside the plunger rod 105. The bottom of the plunger rod 105 has an end 115 fitted with holes 116 (to perform the above-mentioned diaphragm function), and has a rod 117 secured to the partition 112 of the sliding rod 104 passing through the center thereof. A system 118 of corresponding helical cams secured respectively to the sliding rod 104 and to the plunger rod 105 provide recentering and wedging in a particular relative angular disposition.

A linkage 130 serves to pull the shock absorber without compressing it when the plunger rod 105 is pulled (towards the hinge axis of the leg) while the landing gear leg is being raised, or to lengthen the leg while the plunger rod 105 is pushed back by said linkage (while the landing gear leg is being lowered) as represented by the position shown in FIG. 1. The plunger rod 105 slides in a bearing 119 formed in the upper portion of the strut 103, and its top end 120 is connected to the linkage 130.

The linkage 130 includes an arm 121 hinged at its bottom end to the plunger rod 105, and at its top end to one end of a lever 122 which is itself hinged at 123 to a pin carried by gusset plates 124 on the strut. The other end of the lever 122 is hinged to a resilient connecting rod having a threshold (a "spring rod") 125 which is in turn hinged to the structure 126 of the airplane. The locked position of the linkage 130 is provided by the resilient connecting rod 125 having a threshold keeping the two alignment arms in an abutment position (by means of a lug 127 associated with the arm 121) which is slightly out of alignment, being slightly beyond dead center from the side that closes up when the undercarriage is raised.

FIG. 2 is on a larger scale and shows the top portion of the above-mentioned landing gear 100, and in particular it shows said linkage, using continuous lines to show the position that corresponds to the leg being lengthened and the undercarriage down, and chain-dotted lines to show the position corresponding to the leg being shortened with the undercarriage up, with shortening being intrinsic to the linkage. The lengthening or shortening stroke obtained is referenced c.

Such landing gear gives full satisfaction under normal operating conditions. However, if the resilient connecting rod having a threshold should fail, then normal operation is affected.

Thus, if the connecting rod breaks while the landing gear is in its raised position or while it is being lowered, then the lowering of the landing gear is affected insofar as the leg does not lengthen normally. In addition, in the undercarriage-down position, there is no longer any positive locking of the alignment in the linkage, and said alignment can thus collapse on impact when the wheels touch the ground, which would cause the landing gear to collapse vertically.

OBJECT AND SUMMARY OF THE INVENTION

The invention seeks specifically to solve that problem by designing landing gear having a shortenable leg that is capable of operating safely even in the event of a failure in the resilient connecting rod having a threshold.

The invention thus seeks to provide landing gear having a shortenable leg, in which the structure is such as to avoid the above-mentioned drawbacks, and in particular is capable of coping with the circumstance of the resilient connecting rod having a threshold being broken.

More particularly, the present invention provides a raisable landing gear having a shortenable leg, including a leg hinged to the structure of an airplane, the leg being constituted by a strut housing a shock absorber mainly constituted by a sliding rod and by a shock absorber plunger rod, together with a linkage connecting said plunger rod to the strut and under the control of a resilient connecting rod having a threshold and fixed to the structure of the airplane, in such a manner as to pull the shock absorber while the leg is being raised and to push said shock absorber while said leg is being lowered, wherein the linkage includes two arms forming an alignment, with a first arm hinged on the plunger rod of the shock absorber and having a lateral appendix whose free end is capable of co-operating with a stationary cam integral with the structure of the airplane, and a second arm hinged to the strut, together with a lever constrained to rotate with said second arm and connected to the threshold connecting rod, said lateral appendix and said stationary cam being organized to act in an emergency to ensure that the shock absorber is extended and that said shock absorber is locked in the undercarriage-down position.

In a particular embodiment, the lateral appendix of the first arm is disposed in the vicinity of the hinge between the two arms, and the lateral appendix extends in the alignment plane formed by the two arms, in a direction substantially perpendicular to the general direction of the first arm.

Advantageously, the free end of the lateral appendix of the first arm is provided with a wheel that runs over the stationary cam during emergency operation.

In another particular embodiment, the stationary cam includes, in succession, a first portion serving to ensure that the shock absorber begins to be extended, and a second portion forming a positive abutment for locking said shock absorber in the undercarriage-down position on contact being made with the ground. In particular, the first portion of the stationary cam may be generally concave in shape, while the second portion of said cam is generally convex.

According to another possible feature, the second arm and the lever which is coupled thereto are disposed on opposite sides of a strut appendix associated with their hinge on said strut. In particular, the second arm and the associated lever may both extend from the same side of their hinge axis.

Figure 2:
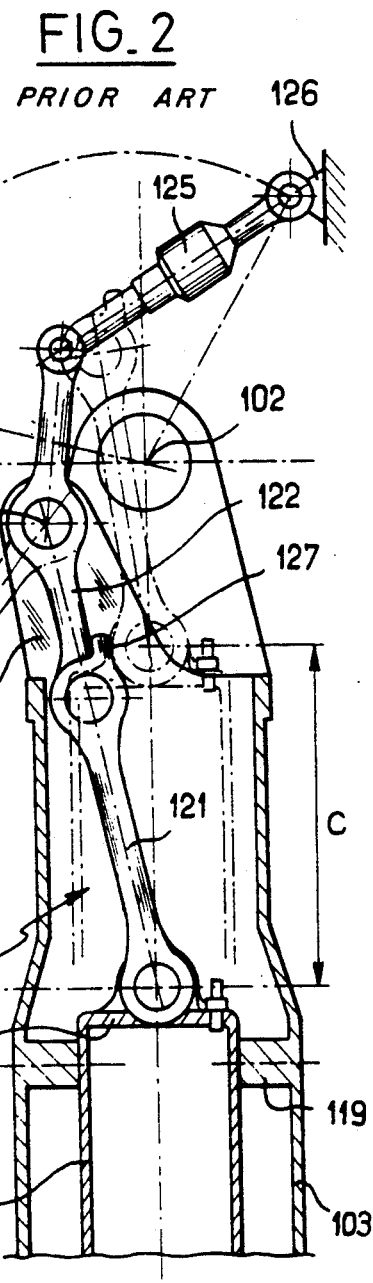
Figure 3:
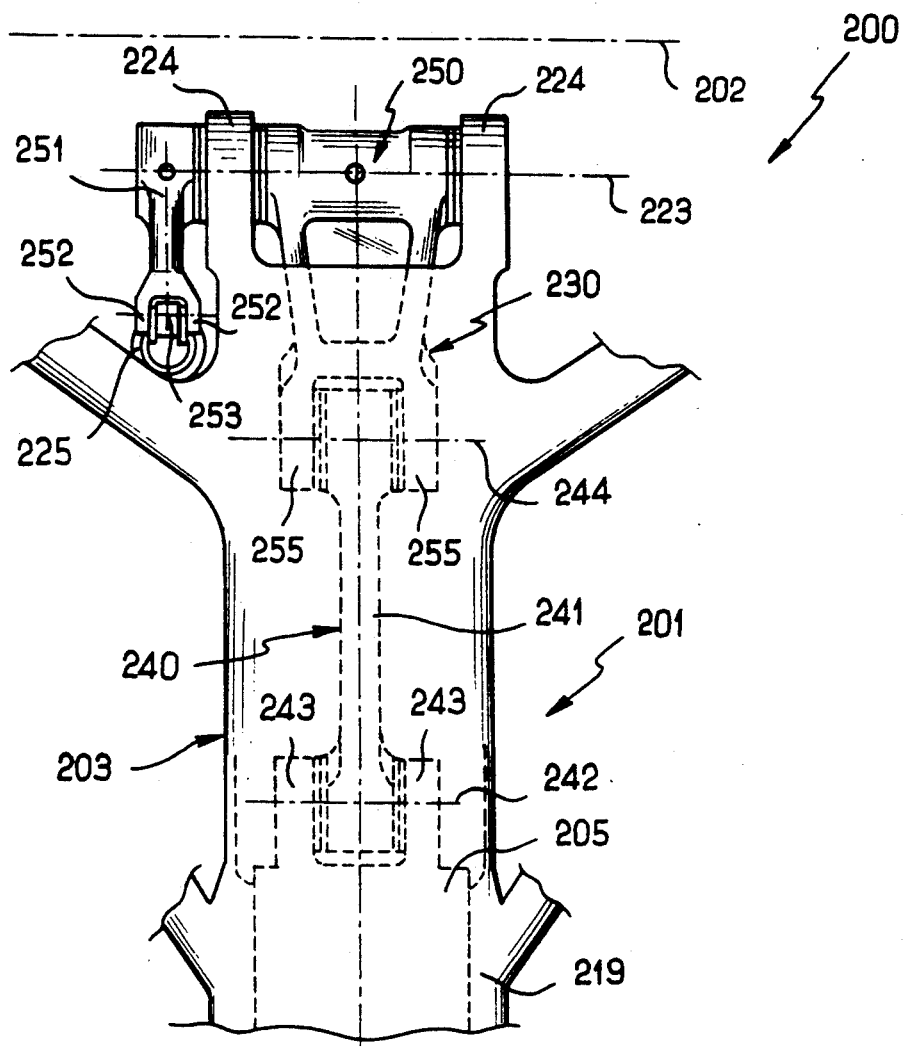
Figure 4:
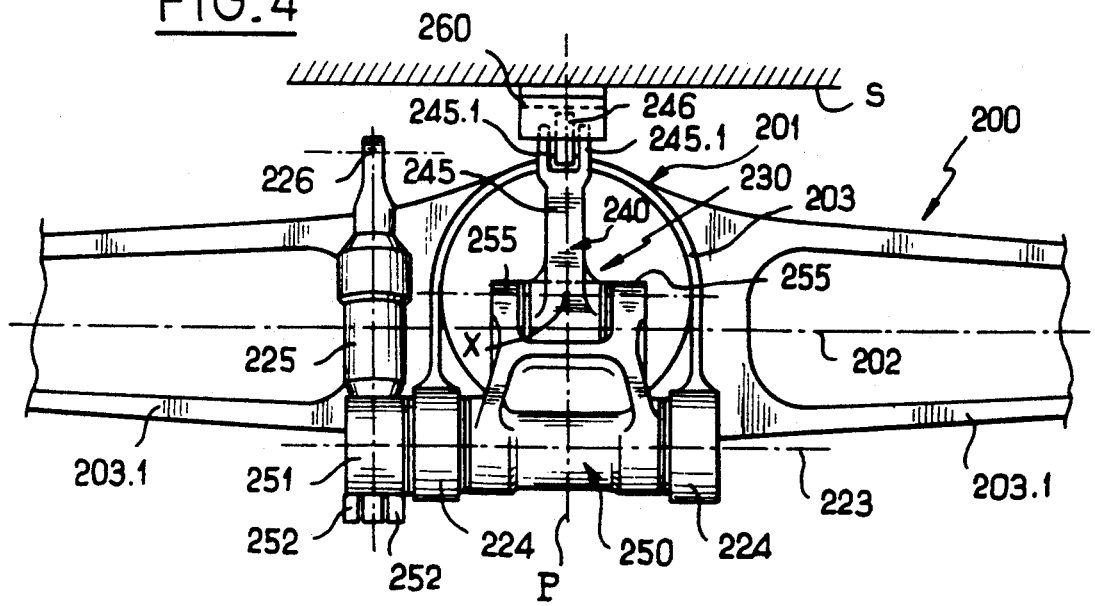
Figure 5:
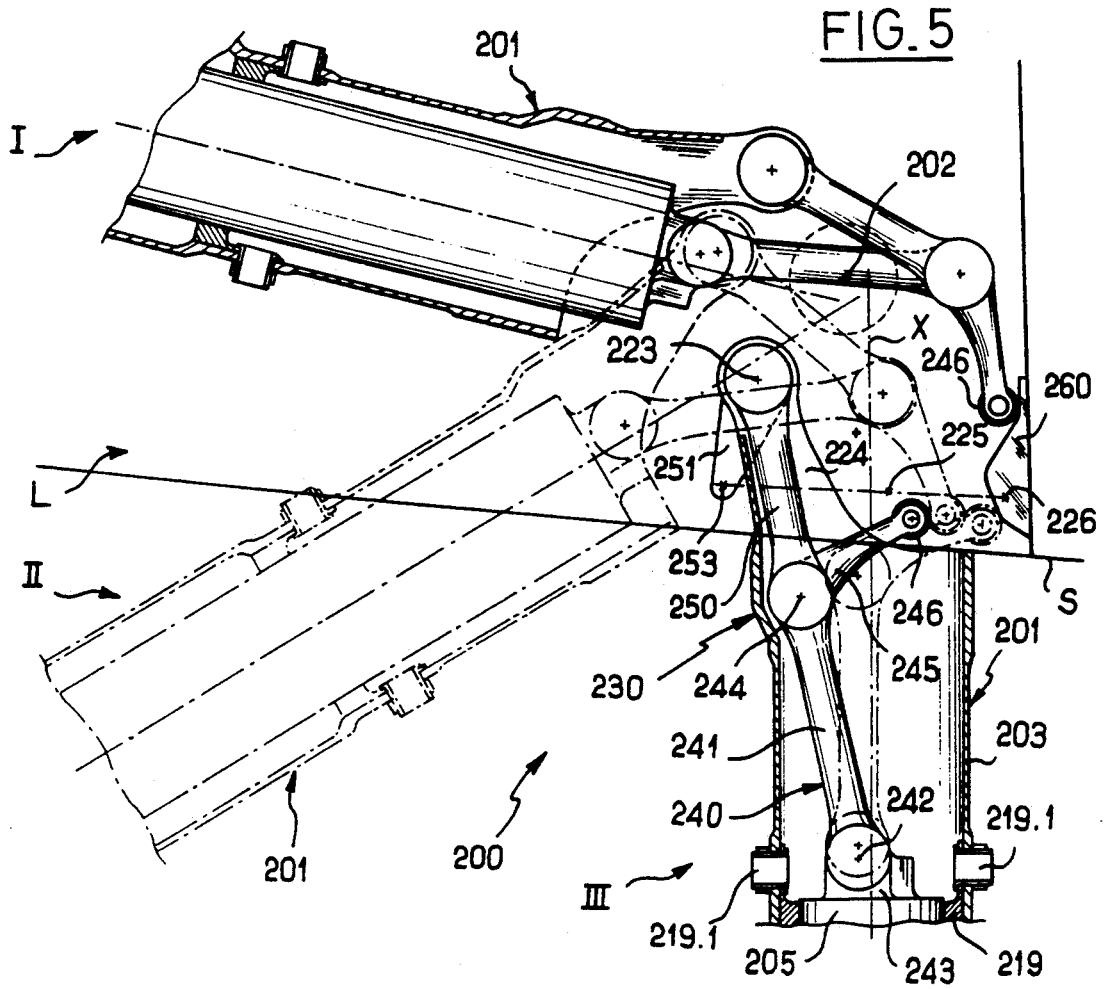
Figure 6:
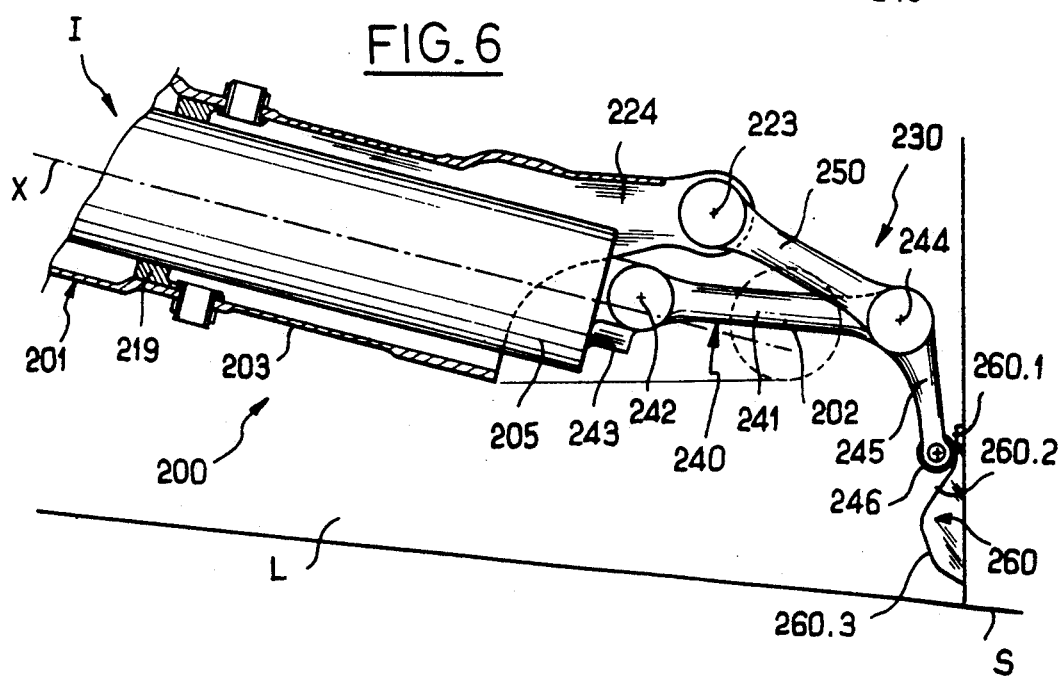
Figure 7:
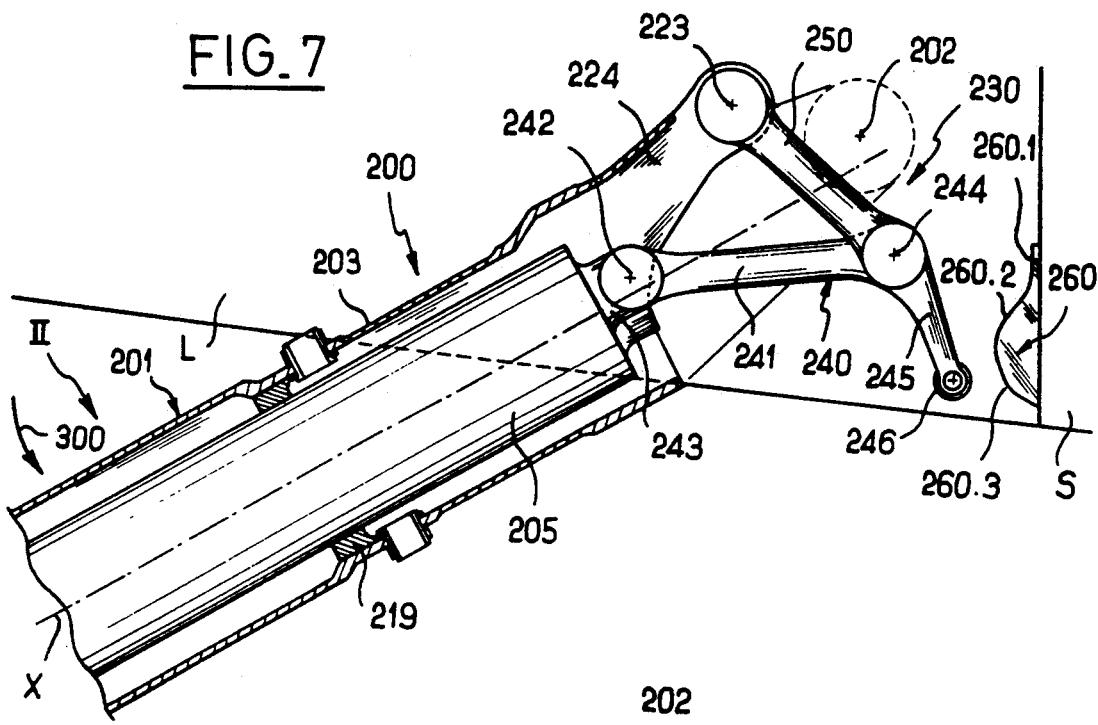
Figure 8:
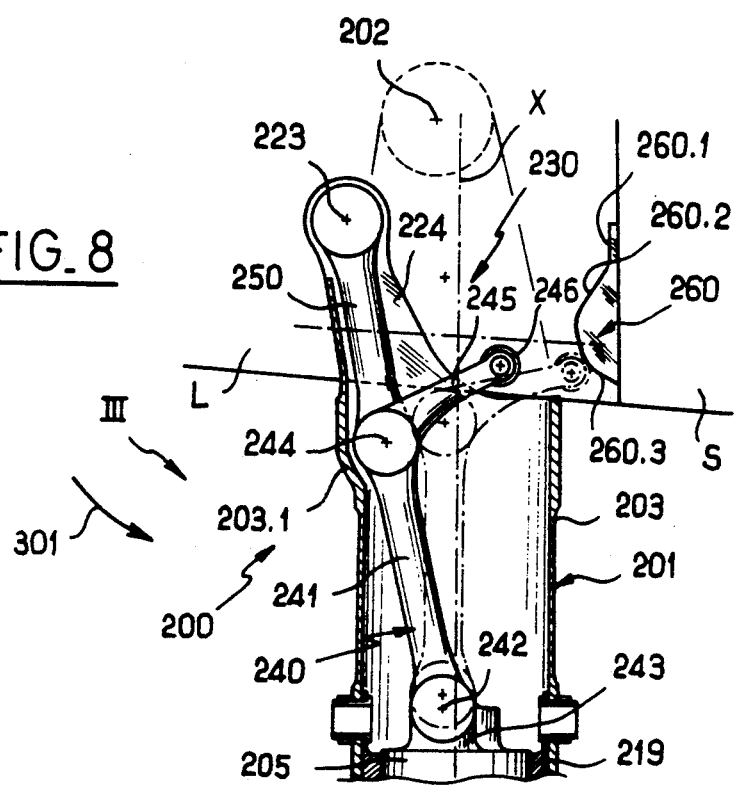

Other characteristics and advantages of the invention appear more clearly in the light of the following description and the accompanying drawings which relate to a particular embodiment of the invention, described with reference to FIGS. 3 to 8, in which:

FIGS. 3 and 4 are an elevation view and a plan view of the top portion of landing gear having a shortenable leg and in accordance with the invention (shown in the undercarriage-down position), the bottom portion of said landing gear may be identical or similar to that of the prior art landing gear described above with reference to FIGS. 1 and 2;

FIG. 5 shows the landing gear of the invention having a shortenable leg in three positions of interest, namely: the undercarriage-up position; the undercarriage-down position; and an intermediate position during normal operation; the figure also using chain-dotted lines to show how the undercarriage-down position is locked in the event of a failure of the resilient connecting rod having a threshold; and FIGS. 6 to 8 illustrate each of the three abovementioned positions of interest, separately.

MORE DETAILED DESCRIPTION

FIGS. 3 and 4 show shortenable-leg landing gear 200 of the invention in the undercarriage-down position, with the figures being restricted to the upper portion of said landing gear, it being understood that the lower portion thereof may be identical or analogous to the lower portion of the landing gear 100 described above with reference to FIGS. 1 and 2.

FIGS. 3 and 4 show a leg 201 hinged about an axis 202 to the structure S of an airplane, and constituted by a strut 203 housing a shock absorber mainly comprising a sliding rod (not shown in these figures) and a shock absorbing plunger rod 205. The plunger rod 205 slides in a bearing 219 secured to the strut 203, and in this case said bearing is installed in the strut by means of fastening pins 219.1, as can be seen in FIG. 5. The shock absorbing strut 203 is upwardly extended by arms 203.1 which terminate at hinges associated with the hinge axis 202 of the landing gear leg, using conventional structures.

In accordance with an essential aspect of the invention, the landing gear 200 includes a linkage 230 constituted by two arms 240 and 250 that form an alignment, comprising a first arm 240 hinged on the plunger rod of the shock absorber 205 and having a lateral appendix 245 whose free end 246 is suitable for co-operating with a stationary cam 260 secured to the airplane structure S, and a second arm 250 hinged on the strut 203, together with a lever 251 constrained to rotate with the second arm 250 and connected to a threshold connecting rod 225, the lateral appendix 245 and the stationary cam 260 being organized to provide safety in an emergency by ensuring that the shock absorber extends and is locked in the extended position when the undercarriage is down, as explained below in greater detail with reference to FIGS. 5 to 8.

The first arm 240 includes an alignment arm 241 which is hinged at its bottom end at 242 to the plunger rod 205, being held in this case between two appendices 243 on said plunger rod. This alignment arm 241 is hinged at 244 with the second arm 250, the top end of said alignment arm 241 being received, in this case, between two bottom appendices 255 of said second arm 250. The second arm 250 of the alignment is hinged at 223 on two associated appendices 224 of the strut 203.

Figure 1:
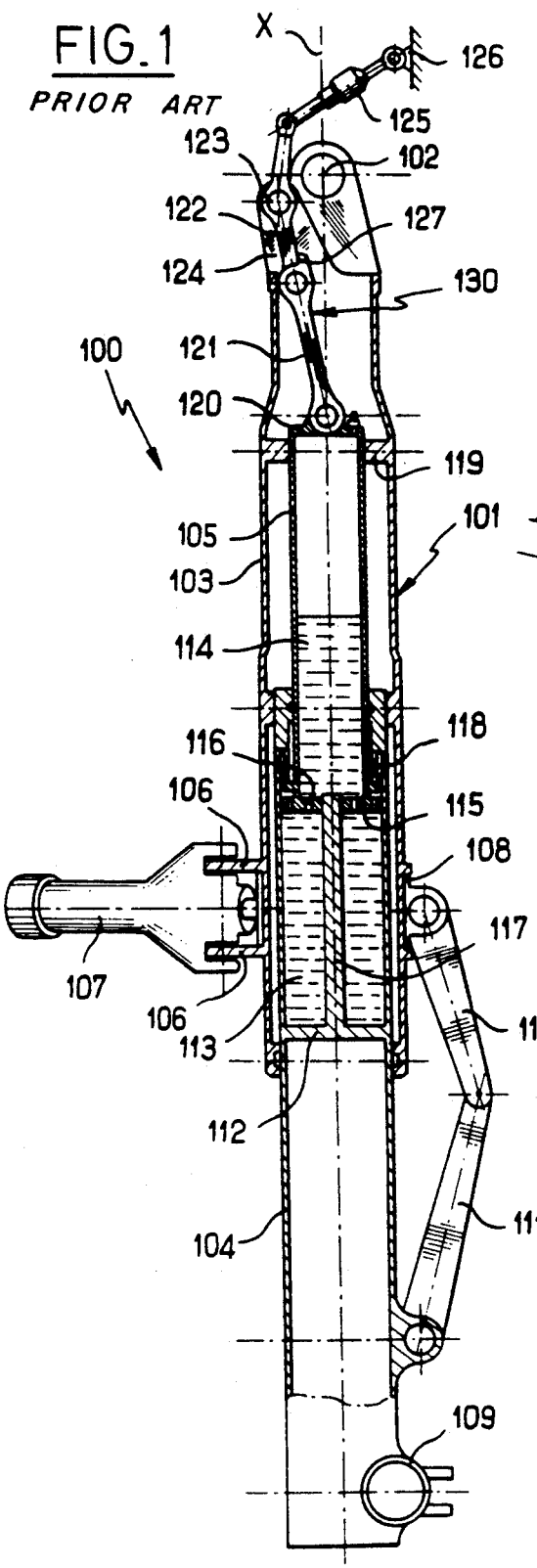
FIGS. 1 and 2 show prior art landing gear having a shortenable leg.

The second arm 250 and the lever 251 coupled thereto are disposed, in this case, on either side of one of the appendices 224 of the strut 203, extending from the same side of their hinge 223, which configuration is naturally not essential, but nevertheless makes it possible to obtain a structure that is particularly compact (it would also be possible to use an organization analogous to that of the prior art landing gear shown in FIGS. 1 and 2, in which case the second arm 250 and the lever 251 would extend from opposite sides of the hinge 223). The free end of the lever 251 is terminated by two branches 252 that receive one of the ends 253 of the threshold connecting rod 225. The other end of said resilient connecting rod 225 having a threshold is hinged at 226 to the airplane structure. It should be observed that the threshold rod 225 is represented merely by chain-dotted lines in FIG. 5, and that for reasons of clarity FIGS. 6 to 8 which show the three positions of interest of said shortenable leg landing gear of the invention do not show said threshold connecting rod and the associated lever.

The lateral appendix 254 of the first arm 240 is disposed in this case in the vicinity of the hinge 244 between the two arms 240 and 250 of the alignment, but naturally, that is merely one particular embodiment. More precisely, the lateral appendix 245 extends in the plane of the alignment formed by the two arms 240 and 250 (which plane P is more clearly visible in FIG. 4), and it extends in a direction substantially perpendicular to the general direction of the first arm 240, as can be seen more clearly in FIGS. 5 to 8. The above-mentioned appendices 255 determine the direction of the lateral appendix in the plane P so that the end of said appendix is always properly positioned relative to the stationary cam 260. The first arm 240 is thus in the form of a crank lever, having one branch constituting a portion of the alignment of the leg-shortening system. The lateral appendix 245 is preferably terminated at its free end by two branches 245.1 between which a wheel 246 is disposed and is capable of running over the stationary cam 260 during an emergency operation, as described below.

There follows a description of the way in which the landing gear 200 operates, given with reference to FIGS. 5 to 8, initially how it operates normally, and subsequently how it operates in an emergency in the event of the resilient connecting rod having a threshold failing, which connecting rod is preferably designed to have two thresholds so as to operate both in traction and in compression.

FIG. 5 shows the shortenable landing gear 200 in three positions of interest namely: a position referenced I which corresponds to the undercarriage being up (shown in continuous lines); a position referenced III corresponding to the undercarriage being down (also in continuous lines); and an intermediate position referenced II (in chain-dotted lines). The undercarriage-down position also includes a chain-dotted illustration of the first arm to show how locking is obtained in the event of the resilient connecting rod having a threshold being defective.

FIGS. 6 to 8 show the three above-mentioned positions of interest I, II, and III separately, while omitting the lever coupled to the second arm and the threshold connecting rod.

In position I, the landing gear is raised and housed in a housing L. The shock absorber then has maximum pull applied to its plunger rod 205, and the linkage formed by the alignment arm 241 and the second arm 250 is completely closed. In this position, the wheel 246 of the lateral appendix 245 is disposed in the vicinity of the cam 260, but it does not come into contact therewith.

During normal lowering of the landing gear, as represented by arrow 300 in FIG. 7, the landing gear moves to position II and the leg begins to lengthen under drive from the linkage 230 on the plunger rod 205. In normal operation, the resilient connecting rod having a threshold 225 thus makes it possible to deploy the linkage 230 correctly for the purpose of progressively lengthening the leg of the landing gear. It should also be observed that the wheel 246 of the lateral appendix 245 then continues to move past the surface of the cam 260 without coming into contact therewith.

When the landing gear continues to move down as shown by arrow 301 in FIG. 8, it finally reaches the undercarriage-down position referenced III. The arms 241 and 250 are then substantially in line with each other, forming an alignment (which may be slightly out of alignment, having gone slightly beyond dead center away from the raising side, as in the prior art landing gear, with an associated lug being provided, e.g. on alignment arm 241). The wheel 246 on the lateral appendix 245 then comes level with another portion of the surface of the cam 260 while still not coming into contact therewith.

When the landing gear is raised, still under normal circumstances, it passes from position III to position I, passing through intermediate position II, with the linkage 230 deforming in the same manner as during lowering, thereby progressively shortening the leg until it is shortened as much as possible when the undercarriage is up.

The above operation naturally assumes that the resilient connecting rod 225 having a threshold performs its function normally. In the event of said threshold connecting rod failing, the landing gear equipment of the invention provides emergency operation serving firstly to enable the shock absorber to be extended and secondly to enable said shock absorber to be locked in the undercarriage-down position.

In the event of the resilient connecting rod 225 having a threshold breaking in the undercarriage-up position, when the actuator associated with the landing gear begins to extend the landing gear, the wheel 246 is brought immediately into contact with the stationary cam 260, and more precisely into contact with a first portion 260.1 thereof. As a result, the landing gear passes in normal manner from position I to position II, with the wheel 246 running over said portion 260.1 of the cam, thereby making it possible to ensure that the proper trajectory is followed until the wheels have come out from the housing L (also known as the wheel-bay). The thrust between the wheel and the cam surface thus serves to develop the linkage correctly with very little departure from the normal trajectory. The corresponding angle occupies about 20°. After this position, the wheel 246 runs over another portion 260.2 of the surface of the cam 260, continuing to develop the linkage, i.e. continuing to cause the shock absorber to be extended. On reaching position II, which corresponds to an angle of about 45°, the mass of the shock absorber becomes a driving force and the wheel 246 leaves the cam 260, and this continues until the position III is reached, in which the hinges 242, 244, and 243 are in alignment.

The co-operation between the lateral appendix 245 and the portions 260.1 and 260.2 of the stationary cam 260 thus make it possible to ensure that the shock absorber is extended normally even in the event of failure of the resilient connecting rod 225 having a threshold.

When the landing gear is in the undercarriage-down position, and when the wheels make contact with the ground, a compression force is applied to the alignment 241, 250. The unstable equilibrium of this alignment could be destroyed by the hinge 244 moving towards the wall 203.1 of the strut 203 (assuming that no abutment lug had been provided on one of the arms involved), in which case (with or without an abutment lug) locking is obtained naturally. In contrast, if the hinge 244 moves the other way, then the wheel 246 comes into contact with a portion 260.3 of the cam surface 260, thus forming a positive abutment that locks the shock absorber after it has been pushed in very slightly, thereby making it possible to retain substantially all of the available stroke for absorbing energy. It is thus possible in complete safety to lock the shock absorber of the lengthened leg in the undercarriage-down position.

The stationary cam 260 thus comprises in succession: a first portion 260.1, 260.2 that serves to ensure that the shock absorber begins to be extended, and a second portion 260.3 that forms a positive abutment to ensure that said shock absorber when compressed in the undercarriage-down position is locked when the landing gear comes into contact with the ground. In this case, the first portion is generally concave in shape, being constituted, for example, by two rectilinear lengths 260.1 and 260.2 that run into each other via a rounded portion, while the second portion 260.3 is generally convex in shape, e.g. being circular or angular. The exact shape of the surface of the cam 260 will be determined, in practice, as a function of the desired trajectory, so as to obtain a trajectory that is as close as possible to that of the normal trajectory, even in the event of a failure of the resilient connecting rod having a threshold. It should be observed that in the event of excessive friction preventing the driving mass of the shock absorber being capable of extending the wheels of the landing gear, the cam follower wheel remains in contact with the cam which makes it possible to achieve intermediate position II with full guidance. This thus ensures that the landing gear is nevertheless extended.

The invention is not limited to the embodiment described above, but on the contrary extends to any variant that uses equivalent means to reproduce the essential characteristics specified above.

In particular, the landing gear having a shortenable leg is applicable to all types of landing gear, and in particular both nose wheel landing gear and main landing gear.

We claim:

1. Raisable landing gear having a shortenable leg, including a leg hinged to the structure of an airplane, the leg being constituted by a strut housing a shock absorber mainly constituted by a sliding rod and by a shock absorber plunger rod, together with a linkage connecting said plunger rod to the strut and under the control of a resilient connecting rod having a threshold and fixed to the structure of the airplane, in such a manner as to pull the block absorber while the leg is being raised and to push said shock absorber while said leg is being lowered, wherein the linkage includes two arms forming an alignment, with a first arm hinged on the plunger rod of the shock absorber and having a lateral appendix whose free end is capable of co-operating with a stationary cam integral with the structure of the airplane, and a second arm hinged to the strut, together with a lever constrained to rotate with said second arm and connected to the threshold connecting rod, said lateral appendix and said stationary cam being organized to act in an emergency to ensure that the shock absorber is extended and that said shock absorber is locked in the undercarriage-down position.

2. Landing gear according to claim 1, wherein the lateral appendix of the first arm is disposed in the vicinity of the hinge between the two arms.

3. Landing gear according to claim 2, wherein the lateral appendix extends in the alignment plane formed by the two arms, in a direction substantially perpendicular to the general direction of the first arm.

4. Landing gear according to claim 1, wherein the free end of the lateral appendix of the first arm is provided with a wheel that runs over the stationary cam during emergency operation.

5. Landing gear according to claim 1, wherein the stationary cam includes, in succession, a first portion serving to ensure that the shock absorber begins to be extended, and a second portion forming a positive abutment for locking said shock absorber in the undercarriage-down position on contact being made with the ground.

6. Landing gear according to claim 5, wherein the first portion of the stationary cam is generally concave in shape, while the second portion of said cam is generally convex.

7. Landing gear according claim 1, wherein the second arm and the lever which is coupled thereto are disposed on opposite sides of a strut appendix associated with their hinge on said strut.

8. Landing gear according to claim 7, wherein the second arm and the associated lever both extend from the same side of their hinge axis.

* * * * *